United States Patent [19]

Nelson et al.

[11] 3,807,715
[45] Apr. 30, 1974

[54] METHOD AND APPARATUS FOR HEAT TREATING WELDED JOINTS

[75] Inventors: Jerome W. Nelson; James B. Randolph; Robert E. Pollock, all of Houston, Tex.

[73] Assignee: CRC-Crose International, Inc., Houston, Tex.

[22] Filed: May 18, 1972

[21] Appl. No.: 254,653

[52] U.S. Cl.................. 266/5 F, 148/134, 266/23 M
[51] Int. Cl............................................... C21d 1/00
[58] Field of Search...266/23 K, 23 M, 23 N, 23 NN, 266/5 F; 148/134

[56] References Cited
UNITED STATES PATENTS

| | | | |
|---|---|---|---|
| 1,938,819 | 12/1933 | Eskilson | 266/23 K |
| 2,184,561 | 12/1939 | Babcock et al. | 266/23 M |
| 2,208,121 | 7/1940 | Davis | 266/23 N |
| 2,242,448 | 5/1941 | Bucknam et al. | 266/23 N |
| 2,288,888 | 7/1942 | Clark | 266/23 K |
| 2,394,775 | 2/1946 | Hilstrom et al. | 266/23 M |
| 2,417,412 | 3/1947 | Herbst | 266/23 NN |
| 2,665,900 | 1/1954 | Begerow | 266/23 M |
| 3,575,364 | 4/1971 | Frederick | 266/23 NN |
| 3,604,612 | 9/1971 | Miller | 266/23 K |

*Primary Examiner*—Gerald A. Dost
*Attorney, Agent, or Firm*—Edwin M. Thomas

[57] ABSTRACT

A series of torches mounted on a single traveling carrier and spaced apart in sequence are passed along a newly welded joint such as a girth joint in a pipeline to heat the metal and relieve high hardness commonly found in the zone adjacent deposited weld metal. The invention is used especially to relieve heat induced stresses in electric arc welding of large work pieces, such as thick walled pipes. Acetylene or other high energy fuel is supplied at a closely controlled rate to each torch. All torches are carried along the joint in a group at a predetermined and controlled rate. Spacing between each torch and the work is carefully adjusted and maintained to control the sequential heat inputs into the interior of the work metal. The first torch applies high intensity heat preferably directly on the weld with succeeding torches apply progressively softer flames. The critical area along the weld thus is quickly brought to austenitic temperature range, followed by slower heating and then by slow cooling, to relieve stress and/or to correct grain growth and related crystalline conditions in the metal. A series of four torches attached to a self-propelled and track-guided carrier are preferred. Since the torches are spaced progressively farther and farther from the work surface, the breadth of heat application by successive torches is progressively widened while heat intensity is reduced. At all times the surface temperature remains within tolerance limits.

7 Claims, 7 Drawing Figures

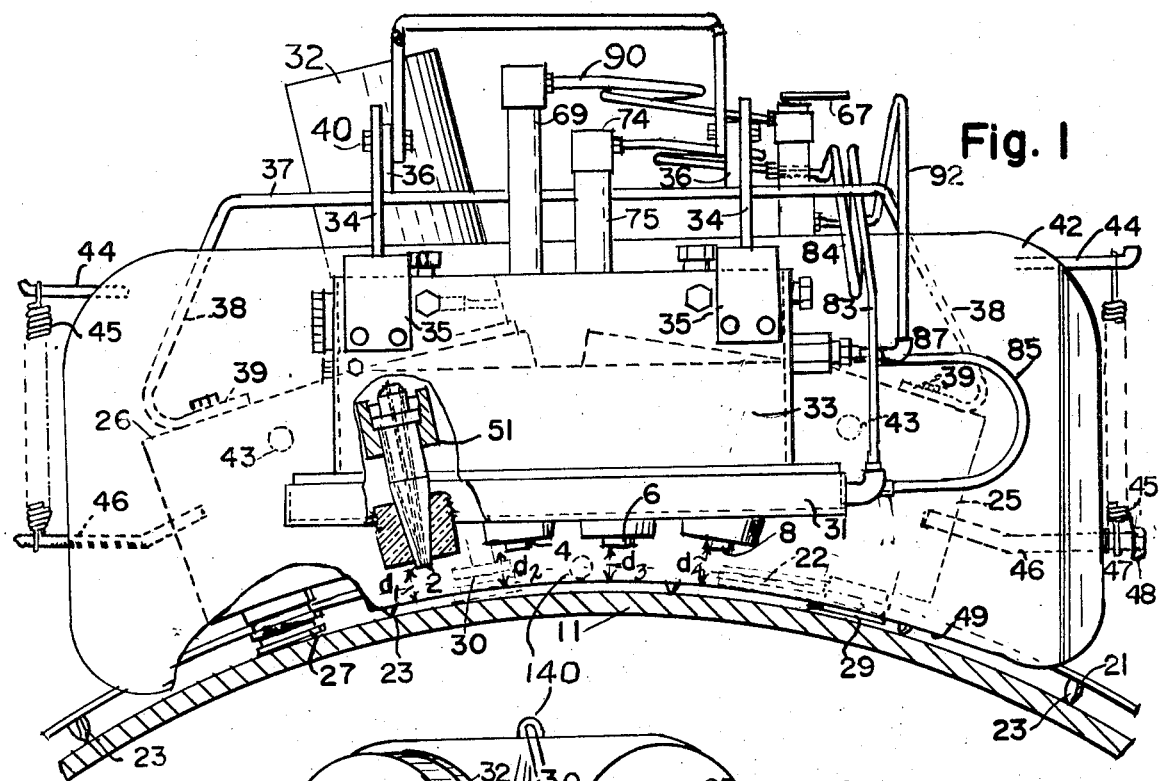
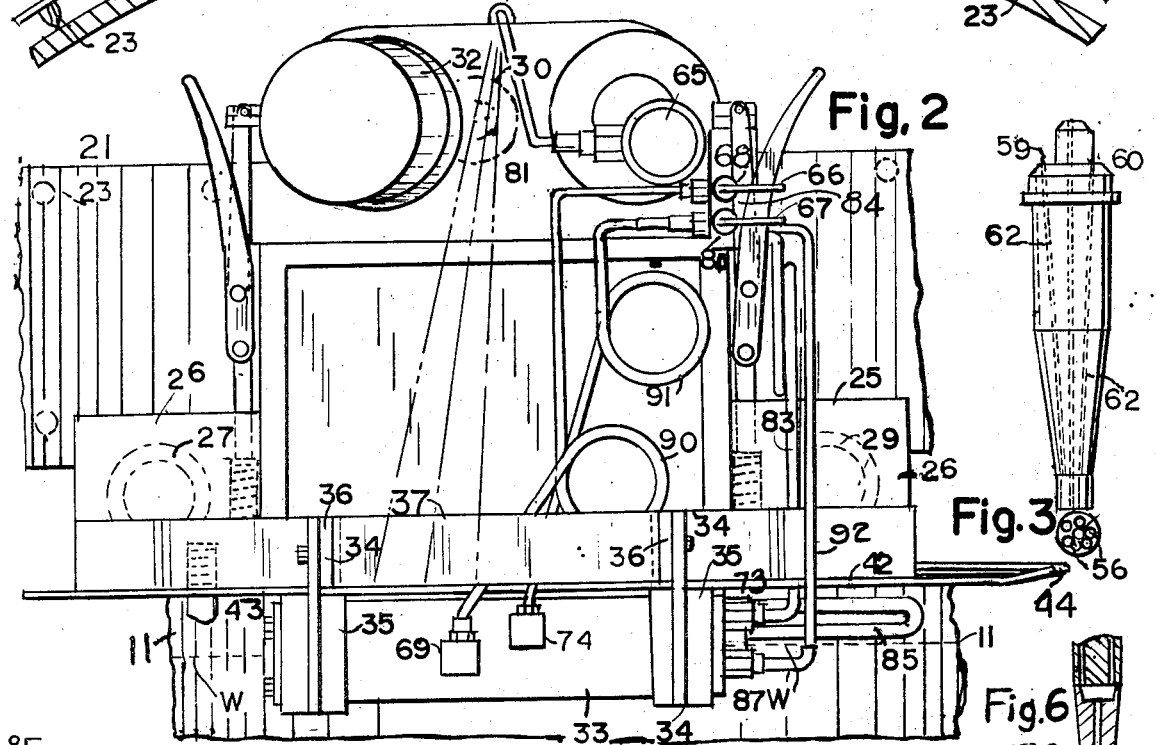
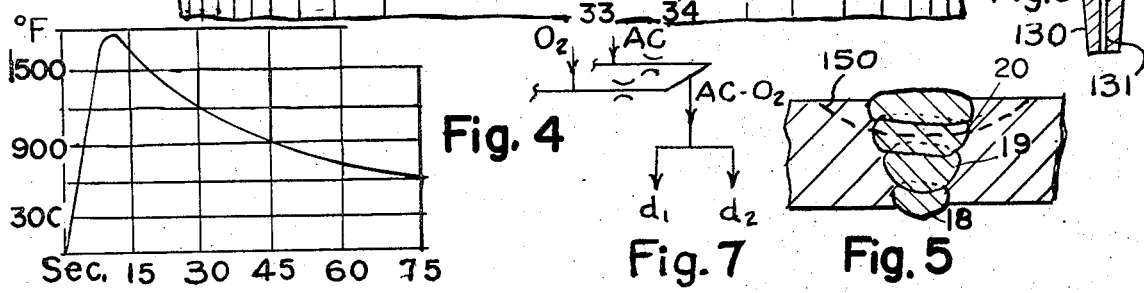

METHOD AND APPARATUS FOR HEAT TREATING WELDED JOINTS

BACKGROUND AND PRIOR ART

The effects of heating and cooling of carbon steels, and the need for corrective heat treating under many conditions, are well known. Austenitic transformation of steel, with accompanying changes in grain size and other crystalline or metallurgical conditions, may produce serious strength deficiencies or render the metal subject to hydrogen embrittlement. In welds produced in steel bodies by the electric arc where heating is intense and cooling is rapid, undesirable effects are often produced. Typical of such welds are those produced at high operating rates between adjacent ends of heavy pipe by consumable electrode welding, using inert gas-shielded electric arc equipment. In welds produced by conventional manual welding of pipelines, the rate of cooling may be slow enough, or the rate of dissipation or heat flow away from the weld area in the metal may be great enough that no serious hardness or embrittlement conditions are produced. Welds in relatively thin wall pipes, e.g., up to a quarter of an inch or so, may present no problems, because heat dissipation is not great.

However, when girth joints are produced in thicker walled pipelines and at high welding rates; i.e., with rapid heat input, as can be done with certain recently developed automatic pipeline welding equipment, some metallurgical problems can arise. If a high rate of welding is achieved in thick walled pipes, e.g., pipes of three-eighths inch or greater wall thickness, or if small passes are made at high speeds, high hardness or brittleness can develop around or within the weld. This kind of hardness is often indicative of a highly strained crystal lattice structure, which can be susceptible to cracking, especially in the presence of atomic hydrogen under high pressure. The production of rapid cooled austenite within the weld, with concomitant grain size alterations and other changes in the metal in and near the joint may leave stresses which can lead to weakness on exposure to hydrogen. Such deficiencies sometimes cannot be tolerated in commercial practice. When these undesirable changes in the metallurgy or crystalline character do occur, they usually can be corrected, especially where it is practicable to apply appropriate and timely heat treatment. Preheat can be used to slow the cooling rate. But this often requires high sustained temperatures difficult to assure which does not lend itself to an automatic operation. The general principles of such treatment are well understood in the art. However, practical and efficient means or procedures for such treatment have not been available so far as the inventors are aware.

A particular object of this invention is to facilitate heat treatment by providing an improved apparatus and method for economical, efficient and closely controllable stress-relieving operations, particularly on newly welded pipelines. However, this treatment can be done at any time. The invention is applicable also to other analogous structures which are difficult or impossible to heat-treat in more conventional ways.

The conditions and problems just mentioned are not limited, of course, to the welding of heavy-walled pipelines, although this is at present an important area of concern. The treatment of hardened areas in other heavy work structures, especially when produced by rapid or excessive heat transfer during welding, with consequent development of austenitic or analogous and undesirable conditions is a general object. Wherever metal bodies have developed susceptibility to hydrogen attack because of hardening due to excessive or too rapid cooling, this invention may have application.

In heat treating to alleviate undesirable metallurgical conditions of the type discussed above, it is necessary, obviously, to apply heat in such a way that it will penetrate to the interior of the structure adequately and at a suitable rate. Prolonged heating may cause undesirable grain growth, etc., and thus fail to give the desired results. The rate of heat input should be such as to accomplish the desired results quickly but not so great as to melt, burn, cut, or otherwise mar or damage any critical surface of the metal being treated. With thick-walled pipes, for example, and analogously with thick plates and other shapes, the heat soak-back or thermal conductance within the metal being treated is greater, of course, than in thinner sections. Hence, the rate of heat transfer should be controllable and selectively variable for different pieces of work.

In addition, with pipelines installed in the field, the joints as laid in the field may be subjected to heavy mechanical stress, due, for example, to local strains on the heavy pipe due, for example, to uneven terrain, etc. It is desirable to be able, if necessary, to treat such pipes while under mechanical stresses of this type without damage to the joints.

It is often difficult or impracticable to apply to a metal in a single pass enough heat to reach the interior of the work and accomplish the desired result without external damage. Part of the heat applied always flows away by conduction within the metal. Also, the heat, as applied, just be intense enough to penetrate in depth into the metal and hence may damage the metal surface, e.g., by raising it to an excessive temperature before the internal temperature is raised to the desired level. Such overheating can result in excessive scaling and/or in creating a wide section of reduced strength. An object of the present invention is to minimize or avoid damage of this kind.

The present invention is based on the discovery that welded joints in heavy or large steel parts can be effectively heat-treated by use of a carefully controlled heating system, employing a plurality of series of heat-applying torches, following each other closely but in a suitable sequence and at appropriate spacings from each other and from the work to give rapid heat input at first, augmented as each succeeding torch passes by, with reduced heat input as the temperature approaches the melting point of the metal.

Thus, a narrow and deep weld, such as is produced in repetitive passes by high speed automatic arc welding equipment between the ends of thick-walled pipes, e.g., walls three-eighths inch and greater thickness, can be effectively heat treated by the means and process of this invention. By passing a properly adjusted series of torches over the work in close succession, controlled and progressively softening heat treatment can be applied around a partially or completely welded girth joint. Strains or hardening caused by rapid cooling are relieved uniformly and effectively. By use of this invention, having appropriate spacing between adjacent torches, combined with closely controlled travel speed, plus appropriate set-back of each successive torch from the surface of the work, and with appropriate heat input to each torch, the surface temperature as well as the internal temperature can be controlled effectively and independently of skill of the operator.

The objective is to heat the critical area as rapidly as possible without localized damage to obtain a specific cooling rate, resulting in a desired normalized structure and tempering effect similar to that of a slow high energy weld pass.

Preferably, a first torch is set rather close to the work, impinging with maximum intensity heat on a narrow central strip of the weld. Each following torch is set progressively farther away from the work and adjusted to produce a somewhat softer flame than its predecessor. These settings, in combination with travel speed are chosen so as to prevent localized damage such as surface burning.

In a typical welding operation on thick-walled pipes, a girth joint is welded by performing a plurality of welding passes in rather rapid succession. For example, in one automatic procedure recently developed, an internal pass may be first formed around the inner part of the joint. Thereafter, a particularly hot or high energy pass may be made to fuse into the first pass and obtain good internal bonding. Two, three or more additional welding passes are made to complete the weld. Each successive welding pass of the welding tends to heat and also to stress-relieve to some extent the preceding pass. Hence, in some cases, only the exterior or final pass may require particular heat treatment for stress relieving. The hardness of the metal at or closely adjacent to the weld deposit, as in consumable electrode welding, is often a good indicator as to the need for heat treating to relieve stress. Many welded pipeline joints will not need stress relieving at all. The present invention is particularly designed to meet requirements for heat treatment where a critical metallurgical condition combined with a critical environment is involved. By measuring such hardness and knowing the environment, the weld will be subjected to the type and degree of heat treatment to be decided upon. For example, in an environment where atomic hydrogen will be present in large amounts, such as in a pipeline transporting sour gas and with a pipe material that produces high hardness over 350 Vickers, for example, this heat treatment would be recommended. By bringing the critical area around the weld into the austenitic temperature range quickly and cooling slowly but at a controlled rate, this hardness can readily be reduced.

SUMMARY OF INVENTION

A traveling heat-treating device, capable of applying a precisely controlled stress-relieving flame to a narrow area of work along a weld line, includes a series of heating torches arranged one after another traveling together. They are set to produce a very high heat input per unit of time. A traveling carriage moves the torches along the joint at a speed selected to give the area a predetermined cooling rate. Preferably, torches fired by oxy-acetylene and mounted at spaced intervals on a single track-guided carrier, move along the weld line with progressively increased spacing from the work to prevent surface damage as the surface temperature rises. By such rapid heating, followed by slow cooling, high-hardness areas along the weld line are eliminated or hardness lowered to a point acceptable for the given application. A series of four torches appear optimum, but more or less may be used for special requirements. The process involves applying heat particularly to the surface welding passes such as are produced by automatic high-capacity arc welding techniques. The invention is applicable also, however, to other welds and to various kinds of metallurgy where stress or hardness relief is required.

BRIEF DESCRIPTION OF DRAWINGS

FIG. 1 is a front elevational view of a preferred apparatus of the present invention.

FIG. 2 is a top view of the apparatus of FIG. 1.

FIG. 3 is a detail view of a single heating nozzle.

FIG. 4 is a graphical representation of a time-temperature operation on a pipeline joint, as practiced by the method of the present invention.

FIG. 5 is a fragmentary cross-section, on enlarged scale, through a typical welded joint in a pipeline.

FIG. 6 is a detail view of an interpass heating nozzle used on thick wall pipe.

FIG. 7 is a schematic diagram of the oxygen and acetylene mixing chamber in the manifold box.

DESCRIPTION OF PREFERRED EMBODIMENT

FIG. 1 shows a portion of a typical welded large diameter steel pipeline 11 formed by welding together successive lengths of pipe, typically of low carbon steel pipe. The invention will be described in connection with a large diameter pipeline. A girth weld will be assumed to have been formed in a series of separate passes, each executed at a fairly high speed, e.g., by high speed automatic electric arc welding apparatus of high heat capacity, with the result that the weld itself and possibly other areas near it need heat treatment to reduce or relieve hardness and/or undesirable stresses. The present invention, of course, is applicable to welds performed manually or mechanically between pipes and other metal shapes also, such as thick flat or curved plates joined edge-to-edge. More generally, the present invention may have application wherever welding or other thermal treatment of steel has rendered it needful to relieve stress or to modify the crystal structure of the metal by heat treatment. The apparatus of FIGS. 1 and 2 is shown arranged especially for heat-treating a pipeline. Such a weld is normally performed in a series of passes 18, 19, 20, etc., FIG. 5.

As shown in FIGS. 1 and 2, a tensioned circumferential track or guide band 21, its ends secured together at 22, to form a bridging joint, and having feet 23 or other spacing members, to hold it away from the pipe surface 11, is tensioned and secured in place about the pipeline nearby and parallel to the joint to be heat treated. The band 21 is spaced laterally or along the pipe axially an appropriate distance from the joint so that a plurality of heating torches 2, 4, 6 and 8, mounted on a traveling self-propelled carriage 25, can travel directly above and along the center line of the welded joint. The carriage 25, of known type per se, and described in detail in U.S. Pat. No. 3,604,612 to Miller and Nelson, is provided with grooved rollers 27, 29 which engage the front edge of the track 21, as seen in FIGS. 1 and 2. Another grooved roller 30, which may be knurled or otherwise roughened to improve its driving traction or grip, engages the far edge of the band 21. It is driven by a suitable electric motor 32, through conventional speed reducing gearing, to propel the carriage 25 along the joint and around the pipe. Both the band and carriage mechanism are known in the art and form no part of the present invention except insofar as it may be necessary or desirable to modify the carriage or control its operation to carry the plural heat-treating torches in suitable manner and at appropriate travel rates for their purpose. The carriage may be arranged to travel all the way around the pipe without stopping, or to travel part way and then reverse, thus performing a joint treating operation either as a continuous operation or in a plurality of steps.

The series of heating torches or torch nozzles 2, 4, 6 and 8 are spaced apart on a cooling water base 31. Each nozzle is secured or mounted in manifold 31 so as to be disposed more or less radially or perpendicular to the surface of the work to be treated and it can be adjusted towards or away from the work. The torches preferably are arranged to travel along the central plane of the welded joint; i.e., the center of each torch is aligned over the center of the weld, but in some cases they may be offset from the weld plane to heat selected areas of the pipe ends or other parts differently. Manifold 31 comprises the base or jacket of a manifold enclosing box or frame structure 33 mounted on the carriage 25 through brackets 34. Brackets 34 are attached to manifold box 33 through inverted U-shaped connectors 35. As seen in FIGS. 1 and 2, these brackets extend rearwardly from box 33 and are secured to posts or plates 36 extending perpendicularly from a sub-frame 37. The latter is turned down and under at each end, as shown at 38, 39, FIG. 1, with the under turned portions 39 being secured to the top of carriage 25 at each end 26 thereof. Thus, the box 33, which carries torches projecting through its cooling water base 31, is supported by bars 34 over and directly above the weld line from the carriage 25. Band 21 which supports the carriage is shown fragmentarily in FIG. 2.

The center line or plane of the welded joint is indicated by the dotted line W of FIG. 2. The brackets 34 are slotted horizontally to receive bolts 40, so they can be adjusted to align the torches with the weld, or to offset them from the weld plane if this should be desired.

Fuel connections to the torches will be described below. In order to protect the carriage 25, its supporting guide rollers 27, 29, and associated bearings and other parts from the heat of the flames, a heat resistant or water cooled shield plate 42 is slidably supported near its ends on two pins 43. Both pins 43 project forwardly through slots in this plate from the carriage, as seen in FIGS. 1 and 2. Each end of plate 42 bears a rod 44 which extends out for attachment of a tension spring 45. The lower end of each spring 45 is secured to a bolt 46 extending outwardly from the carriage base. Rods 46 are each provided with a collar 47 and a retaining nut 48 to keep the springs in place.

With this arrangement, and with plate or shield 42 sandwiched but movable in a plane between manifold box 33 and the front face of carriage 25, the plate can shift with respect to pins 43. Its lower arcuate edge 49, curved to fit the pipe being treated, is held lightly against the pipe surface as the carriage and the heating equipment travel around the pipe, protecting the carriage mechanism and band 21 against excessive heat.

Shield 42, is shaped to conform to the cylindrical surface of a particular diameter of pipe. When pipe of different diameter is to be heat treated, a different shield, fitted to that particular pipe, may be substituted, placing openings therein over pins 43 and attaching the spring 45 to its rod 44, to hold it against the pipe as described above.

An air jet 140, located in the center and lower rear of the carriage, and angled slightly into the pipe, forces a spreading stream of air toward the front of the carriage along the pipe surface. The air stream impinges on the lower edge of shield 42 adjacent to the pipe surface, forming a barrier to prevent the fringes of the flames from the torches passing underneath the shield.

Each of the torches 2, 4, 6 and 8 is mounted in a collar 51 inside box 33. The mounting is shown for tip 2, where the manifold box structure 33 is shown broken away. Preferably, each tip is positioned so that the first is nearest the work and the others are progressively farther from it. Thus, tip 2 is shown at a distance $d_1$, tip 4 at distance $d_2$, tip 6 at distance $d_3$, and tip 8 at distance $d_4$. The result is that the first tip applies an intensely hot flame to the work. If tip 8 were similar in intensity and spacing to tip 2, it would quickly cut into and damage the surface.

Assuming that the device of FIG. 1 is moving counterclockwise around the pipe, that is, from right to left, torch 2 heats the surface of the pipe intensively but moves just fast enough that no cutting or pitting takes place. The second torch comes along just far enough behind that some of the heat applied by the first torch has been conducted away in the metal. It restores the surface temperature to a point just below where fusion or marring would take place, augmenting penetration of the heat into the work. The second torch, being farther from the work, has a somewhat softer or less intense flame.

Similarly, the third and fourth torches are progressively farther from the work having a less intense heat but adding to the heat input thus augmenting heat penetration. This arrangement compensates for absorption or conductance of heat away from the area to be heat treated and adds heat energy without raising the surface temperature enough to damage the metal.

Each torch or tip member 2, 4, etc., has a plurality of small gas outlet orifices 56, a beveled top 59, a peripheral positioning flange 60, and a plurality of gas passageways 62. The outer orifices are shown converging around a central opening in an outer circle as at 56, FIG. 3. This arrangement has been found very satisfactory for heat treating medium wall thickness pipes of low carbon steel and the outer passes of heavier material. FIG. 6 shows an interpass tip 130 for use when inner passes in heavy wall pipe are heat-treated. The single large center outlet 131 provides the narrow flame needed to reach deep into the groove of the partial weldment. Because of its high heat transfer rate, oxygen-acetylene is presently preferred. Other gas mixtures could be substituted, but because of their lower heat input would result in a wider heat affected zone and a less desirable weldment. This might be offset by adding more torches, as would be obvious to those skilled in the art.

FIG. 7 shows a schematic diagram of the premixing chamber located in the upper portion of box 33 allowing the oxygen-acetylene to be thoroughly premixed prior to entry into the tip. Control orifices are placed in each line to provide the proper mixture ratio. Oxygen is supplied at 66, passes through a shut-off valve 68 and travels through line 90, entering box 33 at 69. Acetylene enters at 67, passes through shut-off valve 80 and travels through line 91, entering box 33 at 74. Air for the air shield 140 is controlled through valve 65.

The manifold box 33 is designed so that the front two torches have a separate mixing chamber from the back torches. This allows use of a higher oxygen mixture that gives a higher energy flame to be used on the front torches where the metal is still relatively cold and unaffected by the oxidizing flame.

The assembly of heating units is cooled by circulating water through the jacket 31 and through the manifold box 33. Cold water is brought into connection 84 through a hose line 92 and from a source of supply not shown. Line 92 leads to a manifold connection 87 at box 33. Water passes through the box 33 past each heating tip and back out of box 33 at connection 73. The water then loops from 73 through line 85 and into water jacket 31 passing around each tip and back out of jacket 31 out through line 83 to junction manifold block 84 and out.

It will be noted that all of the lines between the control valve assembly and the heater unit per se include flexible loops. They are provided to facilitate adjustment of the heater with respect to the carriage 25.

In a specific arrangement for treating large diameter pipe joints, the four torches 2, 4, 6 and 8 were spaced about 1½ inches circumferentially apart around the pipe. The nozzle tips were set respectively at distances of about three-eighths - seven-sixteenths - one-half - nine-sixteenths inch from the surface of the capped, welded joint. This arrangement performed very satisfactorily. Obviously, these distances will be varied according to heat output per torch, travel speed, thickness of the work, amount of stress relief needed, etc. Travel rate is preferably between about 5 and 30 inches per minute, depending of course on the metal thickness to be treated, its heat conductivity, and the intensity of flame, as well as nozzle spacing from each other and from the surface of the work.

The method aspect of this invention involves traveling a torch, preferably a series of spaced torches, along the joint, or around it in the case of pipeline welds. The metal needing normalizing or tempering is thus heat treated at such a travel rate and with such flame and heat output that the austenitic temperature range of about 1,500°F or higher or lower tempering range is rapidly attained. FIG. 5 shows a typical depth and width of the normalizing zone (above line 150) with the area below reducing in hardness by the high temperature tempering action. This is done without damaging the work surface by overheating it locally. With plural torches; i.e., a series of four as shown herein shortly after the time the last torch has passed by a given point its full heat input will have penetrated into the metal and the maximum internal temperature of the metal begins to drop. The travel rate should be slow enough to reach the required temperature range without excessive heat input that would cause surface scarring or melting by any of the torches. In some cases, incipient fusion of the surface metal may be just reached by the trailing torches without serious consequences, especially where the weldment has a high reinforcement.

The torches 2, 4, 6 and 8 are spaced far enough apart from each other and their spacing is so related to their travel rate as to permit a substantial heat soak-back or penetration to achieved by each torch before the next torch reaches the previous torch position. Heat at normalizing or high tempering temperatures is especially needed to the particular depth where the most serious or undesirable hardening has occurred. That is, the heat soak-back or conduction into the work desirably begins to occur from a given torch before the next torch comes along. This has been found to be very satisfactory for treatment of thick wall pipe, i.e., wall thickness of about five-eighths to three-fourths inch, for joints electric arc welded at high speed in three to five separate passes, all within a few minutes.

For thinner wall pipe, a higher travel speed (or lower heat input per touch) may be necessary because the joint may not absorb the heat fast enough to avoid surface overheating and consequent damage. For thicker pipe wall and for different types of welds the heat input per torch, the spacing of the torches, the number of torches used in series, and their travel rate may need to be modified, as will be obvious. For some types of welds, e.g., those finished by cap passes where the strain area is near the surface, fewer torches moved at appropriate speed may be sufficient to relieve objectionable hardness. In general, a series of at least three torches is preferred.

The graph of FIG. 4 shows a typical operating time-temperature relationship, where a temperature in the austenitic range can be obtained in a few seconds without surface damage, i.e., at travel rates, with four torches, of around 15 inches or more per minute. Obviously, the time and temperature relationship will vary for different wall thickness and heat inputs, as well as for different metallurgical conditions.

The means for supplying fuel (acetylene and oxygen) to the torches, is quite conventional. Fuel is supplied through low pressure regulators which may be installed at the fuel supply source or in the supply lines.

By keeping close control over pressure of the fuel, over travel speed, and by suitably spacing the individual torches or tips from each other and from the work piece, the precise heat input needed for the treatment can be obtained without any special operator skill. Hardness tests, as indicated above, can be made to test adequacy of treatment. The jet openings in each torch are precision drilled to maintain a fine and accurate control over the gas flow and heat output of each nozzle. Nozzles can be replaced quickly when needed. The number of torches, of course, may be reduced.

Gas and water lines are arranged so that the nozzle or heat assembly can follow the moving torches for a suitable distance without being disconnected. It may be preferred for convenience to treat about half the circumference of a large pipe joint in one sweep and the other half in another. Lines can be long enough to permit traverse of the heater completely around the pipe in a single continuous operation, but it may be simpler to use half-circle sweeps to keep the lines clear with an operator standing on each side of the pipe.

While the invention is not to be considered limited in any way by a specific example, the following will illustrate an actual and successful heat treating operation on a pipeline weld.

A weld was produced to join two sections of large diameter (36-inch) pipe having a wall thickness of one-half inch. The weld was produced by a modified "dip-arc" or "short-arc" technique, with high speed electrode wire feed under welding conditions which form no part of the present invention. It was known from tests made on similar welds, that the metal inside the welded joints, particularly after the cap pass, had cooled at a rate such that high hardness, i.e., as much as 400 to 424 Vickers, and martensitic conditions were produced. Sections cut through sample welds also showed alterations in grain size with probable susceptibility to hydrogen embrittlement and possible cracking. A joint of this kind was heated by use of the apparatus of FIGS. 1 and 2, involving four torches mounted on a self-propelled carriage. Oxygen pressure was adjusted to 30 psi and acetylene to 8 psi. The travel rate of the carriage in this case was approximately 12 inches per minute. The torches were spaced about one and one-half inches apart circumferentially and were set with the first torch spaced radially from the joint three-eighths of an inch, the second seven-sixteenths, the third one-half of an inch and the fourth nine-sixteenths of an inch measuring from nozzle tip to the surface of the pipe. Transversely, each nozzle was centered along the plane of the joint. The metal was heated to a temperature of about 1,800°F on the outside surface and 1,200°F on the inside. The metal surface was not marred by the heat treatment and no scaling was produced even next to the weld. The joint cooled rather rapidly, dropping to about 1,000°F. within 15 seconds after the last torch passed by. Heat effects which were visible externally extended not more than about one-fourth inch on either side of the capped weld, as evidenced by appearance during the weld and by a blued color observed in the steel after cooling. Hardness was reduced to a range of 219 to 243 Vickers in the previous high hardness region.

While the carriage and guiding mechanism shown in the drawings and described above is particularly suited for treatment of welds in pipelines, it will be obvious that joints in flat structures and other shapes may be treated in the same general manner without departing from the invention.

It is obvious, also, that other fuels than acetylene can be used, such as natural gas, propane, ethylene, butane or even hydrogen. Other heating arrangements may be used together with controlled speed, constant and selected spacing from the work, and accurate control of the travel path. All these factors result in close temperature control internally and externally, as explained above. Other modifications and arrangements will suggest themselves to those skilled in the art. It is intended by the claims which follow to cover the invention in both its apparatus and method aspects as broadly as the prior art properly allows.

What is claimed is:

1. Apparatus for heat treating a welded joint by impinging hot flames on the surface while traveling along the path of a girth joint in a metal pipeline or like workpiece to relieve an undesirable physical or metallurgical condition in said joint which comprises, in combination, a flexible band adapted to be mounted around the workpiece in an accurately predeterminable position spaced from but parallel to the joint to be treated, said band thereby serving as a precision guide track, a self-propelled carriage mountable on said band for travel thereon at an accurately predeterminable travel rate, a manifold housing supported by the carriage in position laterally offset from the band for passage of said housing directly over and essentially in the plane of the joint to be treated while the carriage travels on the band, said manifold housing including means for supplying heating gas to burner nozzles and also including means for cooling parts within and associated with the said housing, a series of burner nozzles mounted in said manifold housing and connected to said gas supply means, means for accurately adjusting and prepositioning each of said nozzles in its spacing from the surface of the work to be treated, thereby to control heat spread and intensity of each nozzle onto and into the work, and a baffle means supported by the carriage and located between the carriage and band on one side and the manifold housing on the other side, said baffle means being float mounted to ride freely on the surface of the workpiece during carriage travel, thereby to protect the carriage and band from the direct torch flames.

2. Apparatus according to claim 1 wherein the transporting means is a demountable self-propelled carriage for the torch, and a separate band type guide track for said carriage attachable to the workpiece metal contiguously to the path to be treated.

3. Apparatus according to claim 1 which includes an air jet means on the carriage for directing a stream of air towards the flames to assist the baffle means in protecting the carriage and the band from said flames.

4. Apparatus according to claim 1 which includes four torches spaced progressively farther and farther from the work as they advance over its surface.

5. Apparatus according to claim 4 in which the cooling means for the manifold housing is a water cooling jacket around said housing.

6. Apparatus according to claim 1 in which each of the torch means is provided with a group of precision jet openings for carefully controlling flow of combustible gas and oxygen, thereby to maintain close control over the heating rate of each torch.

7. Apparatus according to claim 1 in which the torch means contains a mixing chamber for fuel and oxygen and an extruded tip with a single outlet opening for placing flame in a narrow-walled deep groove, such as an incompletely filled weld gap.

* * * * *